United States Patent
Lupke et al.

(10) Patent No.: US 6,877,976 B2
(45) Date of Patent: Apr. 12, 2005

(54) MOLDING DIE FOR RIBBED PIPE

(76) Inventors: Manfred A. A. Lupke, 92 Elgin Street, Thornhill, Ontario (CA), L3T 1W6; Stefan A. Lupke, 32 Vintage Lane, Thornhill, Ontario (CA), L3T 1X6

( * ) Notice: Subject to any disclaimer, the term of this patent is extended or adjusted under 35 U.S.C. 154(b) by 222 days.

(21) Appl. No.: 10/236,987

(22) Filed: Sep. 9, 2002

(65) Prior Publication Data

US 2004/0047937 A1 Mar. 11, 2004

(51) Int. Cl.$^7$ ............................................. B29C 47/20
(52) U.S. Cl. ................... 425/325; 425/326.1; 425/380; 425/393; 425/396; 425/369
(58) Field of Search .............................. 425/326.1, 393, 425/396, 380, 461, 325, 369; 264/286, 508

(56) References Cited

U.S. PATENT DOCUMENTS

| | | | |
|---|---|---|---|
| 4,365,948 A | 12/1982 | Chaplain | 425/417 |
| 4,510,013 A * | 4/1985 | Lupke et al. | 156/498 |
| 4,721,594 A | 1/1988 | Jaervenkylae | 264/508 |
| 4,900,503 A | 2/1990 | Hegler | 264/508 |
| 4,936,768 A | 6/1990 | Lupke | 425/532 |
| 4,983,347 A | 1/1991 | Rahn | 264/508 |
| 6,210,617 B1 * | 4/2001 | Holso et al. | 264/209.4 |

* cited by examiner

Primary Examiner—Joseph S. Del Sole

(57) ABSTRACT

A ribbed pipe molding apparatus has a die with a plastic flow passage which carries molten plastic from an extruder to a mold for making the ribbed pipe. The plastic flow passage has a downstream flow region which exits at an acute angle through the external surface of the die. The inner wall of the end region which locates downstream of the outer wall of the flow passage in the downstream flow region of the passage has a transition wall part which is also inclined relative to the exterior surface of the die but which is sloped at a angle less than the main part of the downstream flow region of the passage. The transition wall part of the inner wall shapes the mouth of the passage so as to produce a wedging of the plastic flowing through the passage into the mold for extremely efficient production of the ribs on the pipe.

5 Claims, 4 Drawing Sheets

MOLDING DIE FOR RIBBED PIPE

FIELD OF THE INVENTION

The present invention relates to a die used in a molding apparatus for ribbed pipe. The die has a die mouth specifically shaped to enhance the formation of the ribs on the pipe.

BACKGROUND OF THE INVENTION

The purpose of providing ribs on the exterior surface of a plastic pipe is to strengthen the wall of the pipe. It is therefore important that the construction of the ribs be made in a manner to ensure maximum strength of the ribs.

A preferred method of making a ribbed pipe is through the use of a molding apparatus having a die which feeds to mold blocks which move past and receive molten plastic from a plastic feed passage of the die. It is known to angle the feed passage relative to the mold blocks to set the best direction in which the molten plastic is fed onto the faces of the mold block. For instance, Corma Inc. of Toronto, Ontario, Canada has designed a die with a plastic flow passage angled at about 45° relative to the axis of the die. This passage feeds the molten plastic at the 45° angle onto faces of ribbed pipe forming mold blocks which move parallel to the surface of the die.

SUMMARY OF THE PRESENT INVENTION

The present invention is directed to a die of a molding apparatus with a plastic flow passage having the benefits of the prior Corma angled flow passage design. According to the present invention additional improvements are made to the mouth of the passage for enhancing the flow of plastic from an extruder through the die into mold blocks specifically shaped to form ribbed pipe.

More particularly, the present invention relates to a molding apparatus having a die with a plastic flow passage which carries molten plastic from an extruder to a mold which is shaped to form ribbed pipe. The plastic flow passage has a first flow region parallel to the exterior surface of the die. It also has a second flow region which is angled to exit through the exterior surface of the die. The flow passage is formed by inner and outer walls with the inner wall being located downstream of the outer wall in the second flow region of the plastic flow passage.

Each of the walls in the second flow region has a main wall part which is an acute angle relative to the exterior surface of the die. Each wall also has a termination or end point at the exterior surface of the die. The inner wall in the second flow region of the plastic flow passage further has a transition wall part between the termination point and the main wall part of the inner wall. The transition wall part is inclined relative to the exterior surface of the die but is at a slope which is angled less than that of the main wall part of the inner wall.

As a result of the provision of the transition wall part of the inner wall in the second flow region the mouth of the plastic flow passage is configured to produce a wedging of the molten plastic onto the faces of the rib forming mold blocks. This wedging of the plastic ensures that the plastic completely fills the rib forming parts of the mold block faces resulting in an extremely strong rib construction on the pipe wall.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION IN WHICH

Figure 1:
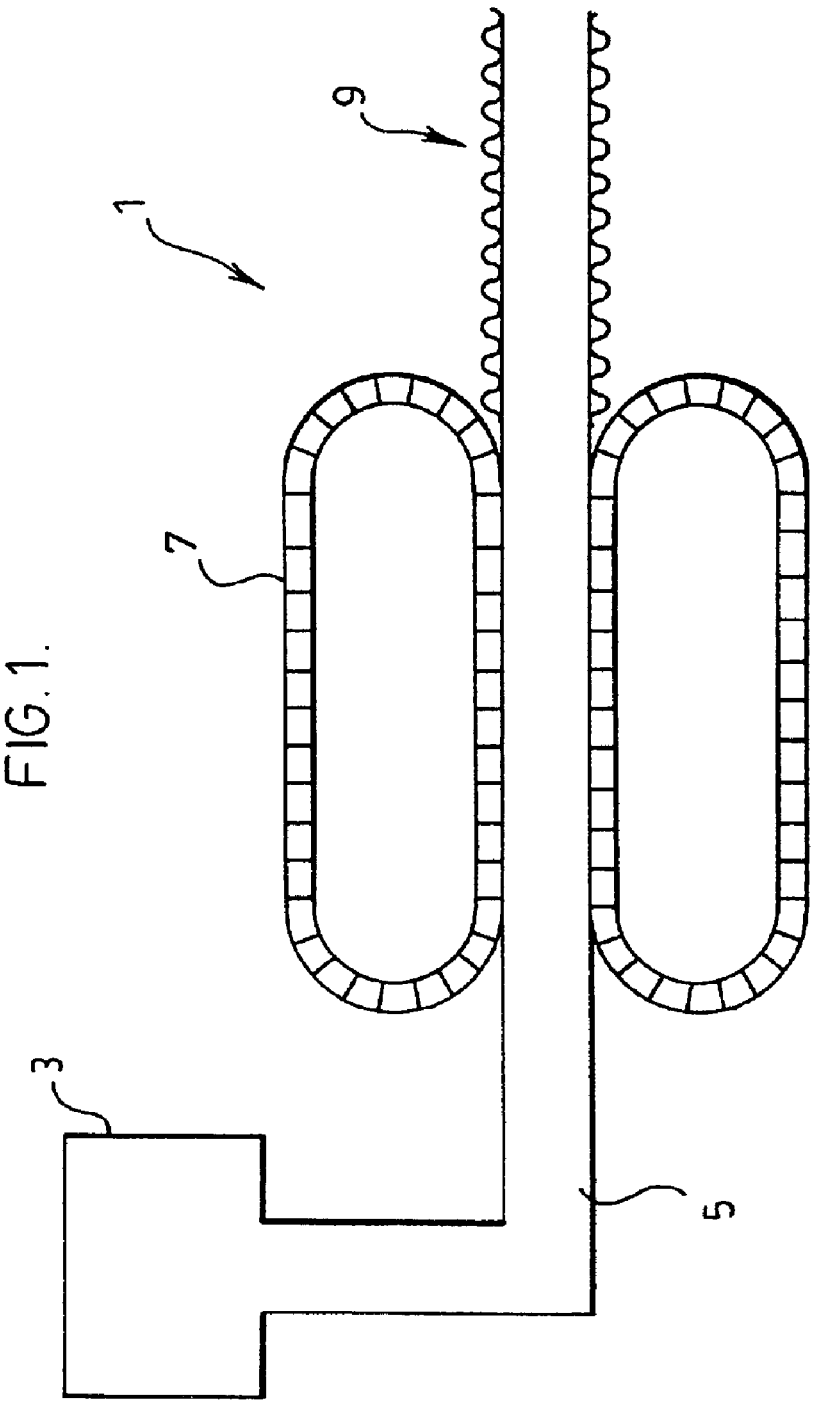
FIG. 1 is a schematic view of a ribbed pipe molding apparatus according to a preferred embodiment of the present invention.

FIG. 1 shows a molding apparatus generally indicated at 3. This molding apparatus comprises an extruder 3 that extrudes molten plastic to a die 5. The die in turn feeds the molten plastic to a corrugator 7 which forms ribbed pipe generally indicated at 9.

Figure 2:
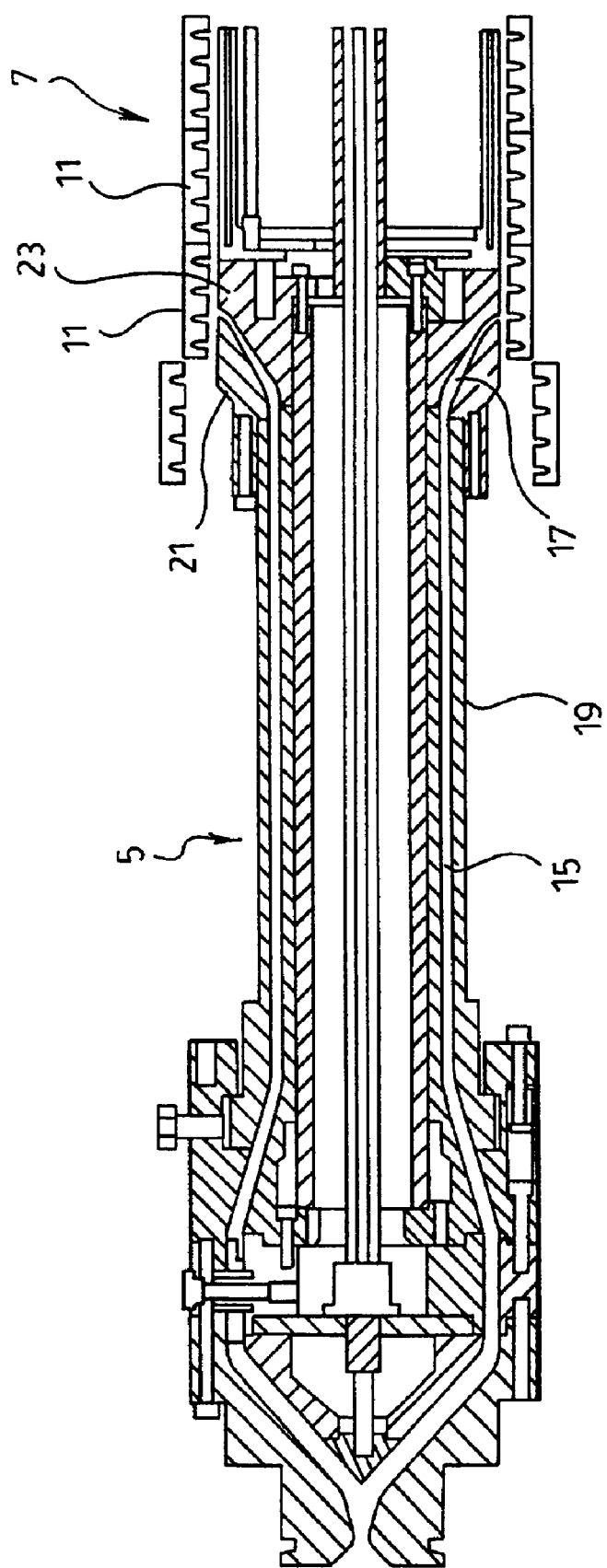
FIG. 2 is an enlarged sectional view of the die between the extruder and the moving mold tunnel of the apparatus of FIG. 1.

FIG. 2 of the drawings shows that the die 5 includes a plastic flow passage the carries molten plastic through the die to the corrugator 7. Corrugator 7 comprises a plurality of side by side mold blocks 11 which revolve on an endless path to provide a moving mold tunnel in which the ribbed the pipe is formed. Each of the mold blocks has a pipe shaping face comprising flat or at least essentially flat surfaces 12 and troughs 13 formed in the mold block faces. The flat molding surfaces 12 lie parallel to the exterior surface 19 of die 5 while the troughs 13 are at essentially 90° to the flat mold surfaces.

The shaping of the mold blocks produces a ribbed pipe having a flat inner wall with radially extending ribs projecting to the outside of the pipe wall as seen in FIG. 1 of the drawings.

The key to the present invention relates to the ability to most effectively force the plastic into troughs 13 of the mold blocks 11.

Earlier reference was made to the provision of a plastic flow channel through die 5. This plastic flow channel extends completely around the die slightly below the external die surface 19. It is formed by a first upstream flow region 19 parallel to the die surface and a second downstream region 17 which is inclined relative to and exits through the surface of the die.

Figure 3:
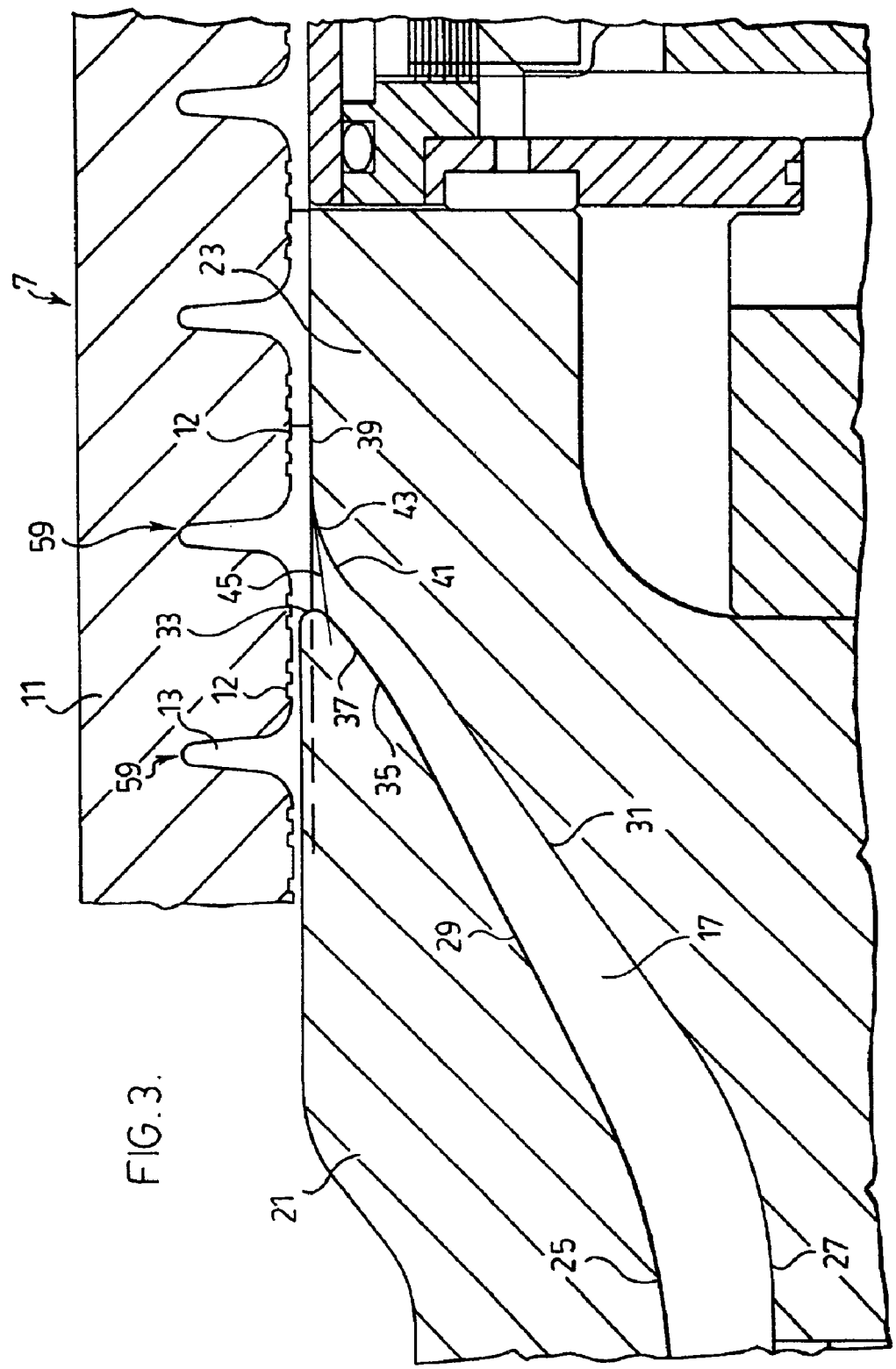
FIG. 3 is an enlarged sectional view of the downstream end of the die of FIG. 2 where the die feeds to the mold tunnel.

FIG. 3 of the drawings shows that the plastic flow passage is defined by an outer wall 25 and an inner wall 27. Wall 25 is located radially outwardly of wall 27 in the first flow region 19 of the passage. In the second flow region 17 of the passage the outer wall 25 is located upstream of the inner wall in the direction of production of the pipe in the molding apparatus.

The outer wall 25 has a termination or end point 33. The inner wall has a termination or end point 39.

The outer wall 25 includes a main wall part 29 in the second flow region of the flow passage. The inner wall 27 includes a main wall part 31 in the second flow region of the passage.

The outer wall 25 is radiused at 35 resulting in a minor wall part 37 between the termination point 33 and the major wall part 29 of the outer wall in the second flow region of the passage.

The inner wall is radiused at 41 to produce a transition wall part 43 between the termination point 39 and the major wall part 31 of the inner wall in the second flow region of the passage. As shown in the drawings transition wall part 43 is preferably flat along its inclined surface.

The mouth of the passage which lies between calibers 21 and 23 of the die is defined by the termination point 33 of the outer wall and termination point 39 of the inner wall of the plastic flow passage.

A number of features will be apparent from FIG. 3 of the drawings. Firstly, the second flow region 17 of the passage tapers inwardly in a downstream direction between the inner and outer walls 27 and 25 before reaching the mouth of the passage. However, the actual mouth of the passage is dramatically increased in width in comparison to the width of the passage between wall part 37 of the outer wall and the radiused area 41 of the inner wall 27.

As will also be seen in FIG. 3 of the drawings the termination point 33 of the outer wall lies radially outwardly of the termination point 39 of the inner wall. Furthermore, a line 45 which is drawn as an extension along the axis of the transition wall part 43 of the inner wall intersects with the minor wall part 37 of the outer wall.

All of the above features produce a shape of the plastic flowing from the plastic flow passage to enhance filling of the troughs 13 on the mold block faces.

In this regard the second flow region 17 between the major wall parts 29 and 31 of walls 25 and 27 is directed at an acute angle e.g. an angle of about 45° relative to the external surface of the die. The minor wall part 37 is set at a steeper angle than the major wall part 29 of the outer wall 25. The transition wall part 43 of the inner wall 27 of the passage while also being inclined relative to the external surface of the die is sloped at an angle less than the major wall part 31 of the inner passage wall in the second flow region of the passage. Therefore, transition wall part 43 of the inner passage wall actually diverges away from the minor wall part 37 and the termination point 33 of the outer passage wall. This results in the wide mouth of the passage as earlier described.

Figure 4:
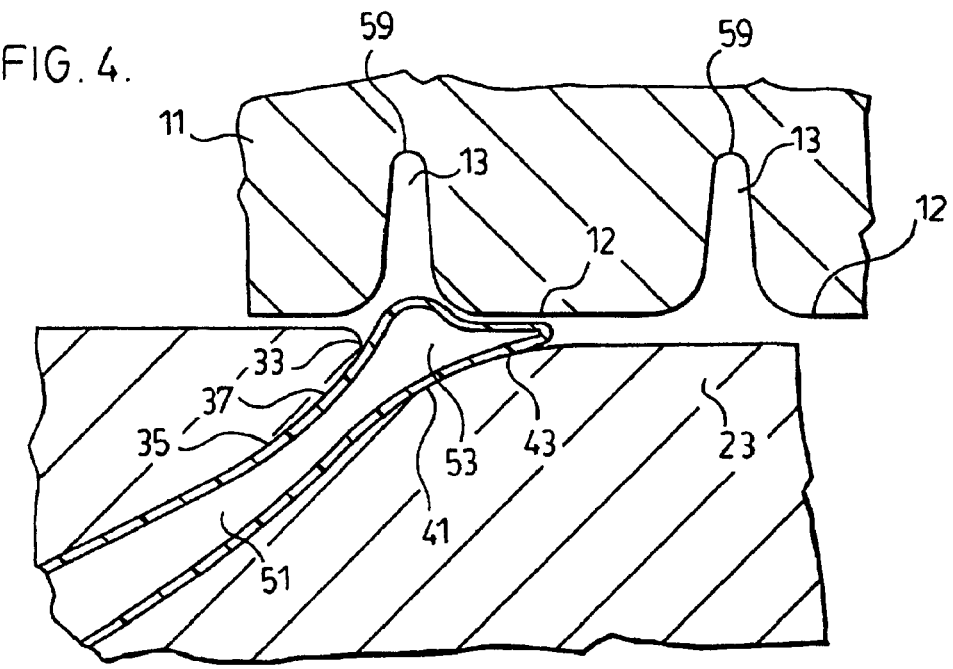
FIGS. 4 and 5 are views similar to FIG. 3 and additionally showing the flow of plastic from the die onto the mold blocks of the mold tunnel.

Reference is now had to FIG. 4 of the drawings which shows a plastic flow 51 of molten plastic material along the second flow region of the die passage just as the plastic is leaving the die directed at the mold blocks. Here it will be seen that the plastic emerges in a wedged configuration 53 at the mold block faces. This is caused firstly by the constriction in the mold passage and then a rapid substantial enlarging of the mouth of the passage. The plastic immediately attempts to flow in a downstream direction out of the passage mouth. However, only so much of the plastic material can fit between the flat mold surface 12 and the surface of caliber 23. The amount of plastic leaving the flow passage exceeds this amount causing the plastic to be wedged upwardly into the troughs 13 in the mold block face. Added to this is the fact that the troughs 13 are provided with small slits 59 through which an external vacuum is applied drawing the plastic up inwardly into the troughs.

Figure 5:
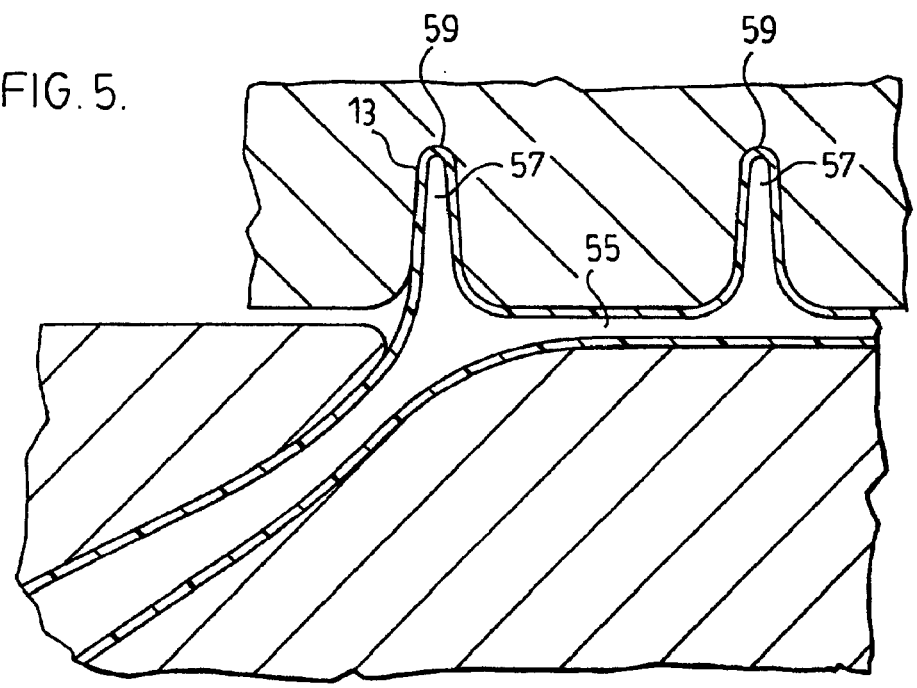

As a result of all of the above, the pipe wall is formed as shown in FIG. 5 with flat wall segments 55 and ribs 57 along the pipe wall. The ribs 57 completely fill the troughs 13 in the mold block faces thereby eliminating any voids or inconsistencies in the ribs. These ribs therefore are extremely strong providing the desired rigidity to the pipe.

It will now be seen how a die of a pipe molding apparatus with a specifically shaped downstream flow region of the plastic flow passage exiting through the die body at the mold faces produces a very efficient wedging action for filling of the troughs in the mold block faces.

Although various preferred embodiments of the present invention have been described in detail, it will be appreciated by those skilled in the art that variations may be made without departing from the spirit of the invention or the scope of the appended claims.

The embodiments of the invention in which an exclusive property or privilege is claimed are defined as follows:

1. A molding apparatus having a die with a plastic flow passage which carries molten plastic from an extruder to a mold which is shaped to form ribbed pipe, said plastic flow passage having a first flow region parallel to, and a second flow region exiting through, an exterior surface of said die, said flow passage having inner and outer walls, said inner wall being located downstream of said outer wall in said second flow region of said plastic flow passage, each of said walls in said second flow region having a main wall part at an acute angle relative to, and a termination point at said exterior surface of said die, said inner wall in said second flow region further including a transition wall part between said termination point and said main wall part of said inner wall, said transition wall part being inclined relative to said exterior surface of said die and being sloped at an angle less than that of said main wall part of said inner wall; said second flow region gradually narrowing lengthwise thereof between the main wall parts and then widening between the transition wall parts of the inner and outer walls of the flow passage, said outer wall of said passage in said second flow region includes a minor wall part between the termination point and the main wall part of the outer wall, the transition wall part of the inner wall being flat axially of the die and having an axis which intersects with the minor wall part in the outer wall of the passage; to the minor wall part of the outer wall being inclined relative to the exterior surface of the die and being sloped at an angle greater than that of the main wall part of the outer wall.

2. A molding apparatus as claimed in claim 1 wherein said transition wall part of said inner wall in said second flow region of said passage is inclined at an angle of between 2° and 10° relative to the exterior surface of the die.

3. A molding apparatus as claimed in claim 2 wherein said transition wall part is inclined at an angle of about 5° relative to the exterior surface of said die.

4. A molding apparatus as claimed in claim 1 wherein said termination point of said outer wall is positioned radially outwardly of said termination point of said inner wall on said die.

5. A molding apparatus as claimed in claim 1 wherein said passage has a passage mouth between the termination points of the inner and outer walls of the passage, the transition wall part of the inner wall placing the termination point of the inner wall at a position downstream of the termination point of the outer wall such that the passage mouth has a width substantially greater than the width of the passage between the main wall parts of the inner and outer walls of the passage in the second flow region of the passage.

* * * * *